United States Patent
Arikuma et al.

(10) Patent No.: US 11,587,415 B2
(45) Date of Patent: Feb. 21, 2023

(54) DATA STREAM ALLOCATION METHOD, SYSTEM AND PROGRAM

(71) Applicant: NEC Corporation, Tokyo (JP)

(72) Inventors: Takeshi Arikuma, Tokyo (JP); Takatoshi Kitano, Tokyo (JP); Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/427,207

(22) PCT Filed: Jan. 31, 2019

(86) PCT No.: PCT/JP2019/003292
§ 371 (c)(1),
(2) Date: Jul. 30, 2021

(87) PCT Pub. No.: WO2020/157885
PCT Pub. Date: Aug. 6, 2020

(65) Prior Publication Data
US 2022/0148395 A1    May 12, 2022

(51) Int. Cl.
*G08B 13/196* (2006.01)
*H04N 7/08* (2006.01)

(52) U.S. Cl.
CPC .  *G08B 13/19602* (2013.01); *G08B 13/19654* (2013.01); *H04N 7/0806* (2013.01)

(58) Field of Classification Search
None
See application file for complete search history.

(56) References Cited

U.S. PATENT DOCUMENTS

| 10,587,844 | B2* | 3/2020 | Kim | G06V 20/52 |
| 2010/0026802 | A1* | 2/2010 | Titus | H04N 7/188 |
| | | | | 348/143 |
| 2014/0289568 | A1* | 9/2014 | Koyama | G06F 11/3055 |
| | | | | 714/39 |

(Continued)

FOREIGN PATENT DOCUMENTS

| CA | 3000127 C * | 6/2020 | ......... G06K 9/00771 |
| JP | 2005165492 A | 6/2005 | |

(Continued)

OTHER PUBLICATIONS

International Search Report for PCT Application No. PCT/JP2019/003292, dated Apr. 23, 2019.

(Continued)

*Primary Examiner* — Ricky Chin

(57) ABSTRACT

Provided is a data stream allocation system capable of suppressing inequality in processing loads on a plurality of servers and delays in analysis processing at the servers when the servers analyze the objects of analysis using data streams obtained from a plurality of camera systems. The allocation determination unit 4 allocates data streams obtained from a plurality of camera systems to a plurality of servers according to the unevenness in the number of objects in the surveillance region. Then, the distribution unit 5, in accordance with the results of the allocation of the data streams to the plurality of servers, distributes each of the data streams obtained from the camera systems to the server to which the data stream has been allocated.

6 Claims, 14 Drawing Sheets

(56) References Cited

U.S. PATENT DOCUMENTS

| | | | |
|---|---|---|---|
| 2015/0030260 A1* | 1/2015 | Arikuma | G06V 10/96 |
| | | | 382/309 |
| 2015/0379125 A1* | 12/2015 | Yang | H04N 7/181 |
| | | | 348/231.5 |
| 2016/0050396 A1* | 2/2016 | Gali | H04N 7/181 |
| | | | 348/159 |
| 2017/0324893 A1* | 11/2017 | Matsuda | H04N 5/23216 |
| 2018/0276983 A1* | 9/2018 | Tani | G08B 29/188 |
| 2019/0025801 A1 | 1/2019 | Suzuki et al. | |
| 2019/0035104 A1* | 1/2019 | Cuban | G06V 10/44 |
| 2019/0325198 A1* | 10/2019 | Friedland | G08B 13/196 |
| 2021/0075844 A1* | 3/2021 | Arikuma | G06F 9/50 |
| 2021/0208949 A1 | 7/2021 | Bijwe | |

FOREIGN PATENT DOCUMENTS

| | | | | |
|---|---|---|---|---|
| JP | 2016082424 A | 5/2016 | | |
| WO | 2017038100 A1 | 3/2017 | | |
| WO | 2017130244 A2 | 8/2017 | | |
| WO | WO-2019130244 A1 * | 7/2019 | | G01S 1/725 |

OTHER PUBLICATIONS

English translation of Written opinion for PCT Application No. PCT/JP2019/003292, dated Apr. 23, 2019.

\* cited by examiner

FIG. 2

CAMERA SYSTEM STATISTICAL INFORMATION TABLE

| CAMERA SYSTEM | AVERAGE NUMBER OF OBJECTS | SHOOTING POSITION (LATITUDE, LONGITUDE) |
|---|---|---|
| C001 | 17 | (35.411, 139.421) |
| C002 | 12 | (35.421, 139.421) |
| C003 | 25 | (35.415, 139.421) |
| C004 | 3 | (35.422, 139.421) |
| C005 | 3 | (35.434, 139.421) |
| C006 | 2 | (35.441, 139.421) |
| ... | | |

FIG. 3

AREA TABLE

| AREA | CAMERA SYSTEM | LATEST NUMBER OF OBJECTS | AREA POSITION (LATITUDE, LONGITUDE) | AREA SIZE (LENGTH (m), WIDTH (m)) |
|---|---|---|---|---|
| A001 | C001, C002, C003, C004, C013 | 62 | (35.41, 139.42) | (200, 200) |
| A002 | C005, C006, C007, C008 | 7 | (35.43, 139.42) | (200, 200) |
| A003 | C009, C010, C011, C012 | 10 | (35.45, 139.42) | (200, 200) |
| ... | | | | |

FIG. 4

SERVER TABLE

| SERVER | AREA | LATEST NUMBER OF OBJECTS |
|---|---|---|
| N001 | A001, A002 | 69 |
| N002 | A003, A004 | 10 |
| ... | | |

FIG. 5

MINIMUM AREA SIZE TABLE

| ANALYSIS ID | MINIMUM AREA SIZE |
|---|---|
| 001 | (100, 100) |
| 002 | (200, 200) |
| ... | |

FIG. 8

AREA TABLE

| AREA | CAMERA SYSTEM | LATEST NUMBER OF OBJECTS | AREA POSITION (LATITUDE, LONGITUDE) | AREA SIZE (LENGTH (m), WIDTH (m)) |
|---|---|---|---|---|
| A001 | C001, C003 | 42 | (35.41, 139.42) | (100, 100) |
| A002 | C002, C004, C005 | 16 | (35.42, 139.42) | (200, 200) |
| A003 | C006, C007, C008, C009 | 16 | (35.44, 139.42) | (400, 400) |
| ... | | | | |

FIG. 9

SERVER TABLE

| SERVER | AREA | LATEST NUMBER OF OBJECTS |
|--------|------|--------------------------|
| N001 | A001 | 42 |
| N002 | A002, A003 | 32 |
| ... | | |

FIG. 11

|   | B 16 | F 36 | K 22 |   |
|---|---|---|---|---|
| A 32 | C 42 | D 32 | G 28 | I 23 | L 34 | N 42 |
|   |   | E 16 | H 37 | J 25 | M 41 | O 26 |

FIG. 12

| AREA | NUMBER OF PEOPLE (NUMBER OF OBJECTS) | MINIMUM AREA EQUIVALENT | INDEX VALUE | PRIORITY |
|---|---|---|---|---|
| A | 32 | 8 | 4 | 15 |
| B | 16 | 4 | 4 | 14 |
| C | 42 | 2 | 21 | 10 |
| D | 32 | 1 | 32 | 5 |
| E | 16 | 1 | 16 | 11 |
| F | 36 | 4 | 9 | 12 |
| G | 28 | 1 | 28 | 6 |
| H | 37 | 1 | 37 | 3 |
| I | 23 | 1 | 23 | 9 |
| J | 25 | 1 | 25 | 8 |
| K | 22 | 4 | 5.5 | 13 |
| L | 34 | 1 | 34 | 4 |
| M | 41 | 1 | 41 | 2 |
| N | 42 | 1 | 42 | 1 |
| O | 26 | 1 | 26 | 7 |

FIG. 13

| SERVER | AREA | NUMBER OF PEOPLE (NUMBER OF OBJECTS) | STANDARD VALUE OF PROCESSING CAPACITY |
|---|---|---|---|
| a | N | 42 | 50 |
| b | M | 41 | 50 |
| c | H | 37 | 50 |
| d | L | 34 | 50 |
| e | D | 32 | 50 |
| f | G | 28 | 50 |
| g | O | 26 | 50 |
| h | J | 25 | 50 |
| i | I, E | 23+16 | 50 |
| j | C | 42 | 50 |

FIG. 14

| A 32 | B 16 | F2 21 | | K 22 | |
| | | F1 15 | | | |
| | C 42 | D 32 | G 28 | I 23 | L 34 | N 42 |
| | | E 16 | H 37 | J 25 | M 41 | O 26 |

FIG. 15

| SERVER | AREA | NUMBER OF PEOPLE (NUMBER OF OBJECTS) | STANDARD VALUE OF PROCESSING CAPACITY |
|---|---|---|---|
| a | N | 42 | 50 |
| b | M | 41 | 50 |
| c | H | 37 | 50 |
| d | L | 34 | 50 |
| e | D | 32 | 50 |
| f | G | 28 | 50 |
| g | O | 26 | 50 |
| h | J, F2 | 25+21 | 50 |
| i | I, E | 23+16 | 50 |
| j | C | 42 | 50 |

DATA STREAM ALLOCATION METHOD, SYSTEM AND PROGRAM

This application is a National Stage Entry of PCT/JP2019/003292 filed on Jan. 31, 2019, the contents of all of which are incorporated herein by reference, in their entirety.

TECHNICAL FIELD

The present invention relates to a data stream allocation method, a data stream allocation system, and a data stream allocation program for allocating data streams to servers.

BACKGROUND ART

Patent Literature (PTL) 1 describes arranging on a communication network a plurality of information processing devices having different regions allocated thereto. PTL 1 describes referring to positional information included in traveling information, and transmitting the traveling information to the information processing device to which the region including the point indicated by the positional information has been allocated.

PTL 2 describes adding a partial area, which is part of the area served by a high-load monitoring unit, to the area served by a low-load monitoring unit.

CITATION LIST

Patent Literatures

PTL 1: Japanese Patent Application Laid-Open No. 2005-165492
PTL 2: Japanese Patent Application Laid-Open No. 2016-82424

SUMMARY OF INVENTION

Technical Problem

It is conceivable to monitor a region such as an airport with a plurality of camera systems and analyze data streams (time series data) obtained from the camera systems with a plurality of servers. In this case, as in the technology described in PTL 1, each area defined in the region may be allocated to a server in a fixed manner, and each individual server may analyze the objects in the region using the data streams obtained from the camera systems capturing the area allocated to the server. Here, it is assumed by way of example that the object of analysis is a person. Each camera system generates a data stream for each person it captures.

However, in the above example, if people (objects) present in the region concentrate in a particular area within that region, the amount of data streams processed by the server to which that particular area has been allocated will become large. That is, the amount of data streams transferred to the server to which the area with a high concentration of people has been allocated and the processing load on that server will increase, resulting in delays in the analysis processing. On the other hand, the processing load on the server to which an area with few people has been allocated is small.

It is preferable to be able to suppress such inequality in processing loads among the servers.

In the technology described in PTL 2, the partial area, which is part of the area served by a high-load monitoring unit, is added to the area served by a low-load monitoring unit. However, with the process of adding a partial area of one area to another area, only a local area change is made. Therefore, even if the process of adding a partial area of one area to another area is applied to the above example, the inequality in the processing loads among the servers cannot be sufficiently suppressed.

It is therefore an object of the present invention to provide a data stream allocation method, a data stream allocation system, and a data stream allocation program capable of suppressing inequality in processing loads on a plurality of servers and delays in analysis processing at the servers when the servers analyze the objects of analysis using data streams obtained from a plurality of camera systems.

Solution to Problem

A data stream allocation method according to the present invention is a data stream allocation method implemented by at least one computer and a plurality of servers that analyze objects in a surveillance region using data streams obtained from a plurality of camera systems capturing the surveillance region, the method including: the steps performed by the at least one computer of allocating the data streams obtained from the plurality of camera systems to the plurality of servers according to unevenness in the number of the objects in the surveillance region and, in accordance with the results of the allocation of the data streams to the plurality of servers, distributing each of the data streams obtained from the plurality of camera systems to the server to which the data stream has been allocated; and the step performed by each of the plurality of servers of analyzing the objects using the data streams distributed by the at least one computer.

A data stream allocation system according to the present invention is a data stream allocation system of allocating data streams obtained from a plurality of camera systems capturing a surveillance region to a plurality of servers that analyze objects in the surveillance region using the data streams, the data stream allocation system including: an allocation determination unit configured to allocate the data streams obtained from the plurality of camera systems to the plurality of servers according to unevenness in the number of the objects in the surveillance region; and a distribution unit configured to distribute each of the data streams obtained from the plurality of camera systems to the server to which the data stream has been allocated, in accordance with the results of the allocation of the data streams to the plurality of servers.

A data stream allocation program according to the present invention is a data stream allocation program for causing a computer to allocate data streams obtained from a plurality of camera systems capturing a surveillance region to a plurality of servers that analyze objects in the surveillance region using the data streams, the program causing the computer to perform: an allocation determination process of allocating the data streams obtained from the plurality of camera systems to the plurality of servers according to unevenness in the number of the objects in the surveillance region; and a distribution process of distributing each of the data streams obtained from the plurality of camera systems to the server to which the data stream has been allocated, in accordance with the results of the allocation of the data streams to the plurality of servers.

Advantageous Effects of Invention

According to the present invention, when a plurality of servers analyze the objects of analysis using data streams obtained from a plurality of camera systems, the inequality in processing loads on the servers and the delays in analysis processing at the servers can be suppressed.

BRIEF DESCRIPTION OF DRAWINGS

FIG. 2 It schematically depicts an example of a camera system statistical information table.

FIG. 3 It schematically depicts an example of an area table.

FIG. 4 It schematically depicts an example of a server table.

FIG. 5 It schematically depicts an example of a minimum area size table.

FIG. 8 It schematically depicts an example of the area table after the process of steps S1 to S8.

FIG. 9 It schematically depicts an example of the server table after the process of steps S1 to S8.

FIG. 11 It schematically depicts an example of the areas at the time of shifting to step S7.

FIG. 12 It schematically depicts the index values calculated for areas A to O and the priorities defined in step S12.

FIG. 13 It schematically depicts the results of area allocation in the loop process of steps S14 to S16 up to the time when the area E, which has the eleventh priority, became the selected area.

FIG. 14 It schematically depicts the states of the areas after dividing the area F.

FIG. 15 It schematically depicts the area allocation for each server 8 after allocating the area F2 to the server h.

DESCRIPTION OF EMBODIMENT

An exemplary embodiment of the present invention will be described below with reference to the drawings.

Figure 1:
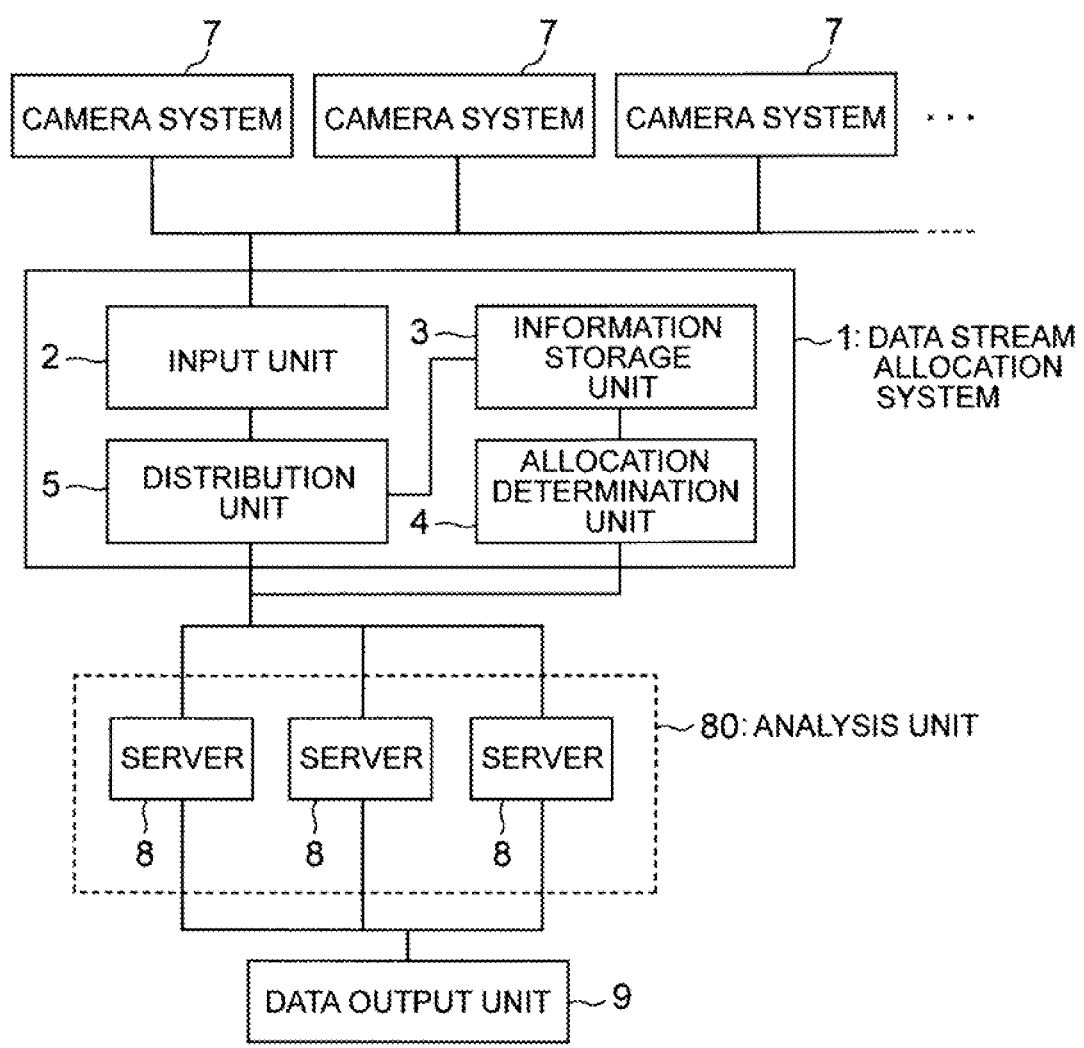
FIG. 1 It is a block diagram depicting an example of a data stream allocation system of an exemplary embodiment of the present invention.

FIG. 1 is a block diagram depicting an example of a data stream allocation system of an exemplary embodiment of the present invention. The data stream allocation system 1 of the present invention is communicably connected to a plurality of camera systems 7 and a plurality of servers 8. In FIG. 1, three camera systems 7 are illustrated, although the number of camera systems 7 is not limited to three. Similarly, while three servers 8 are illustrated in FIG. 1, the number of servers 8 is also not limited to three. Each server 8 is a separate server, and the plurality of servers 8 (set of servers 8) will be referred to as an analysis unit 80 for convenience.

The camera systems 7 will be described firstly.

A plurality of camera systems 7 are installed, for example, to monitor places where people gather in public transportation, and regions such as airports, stadiums, event venues, large-scale commercial facilities, and the like. The region to be captured by the plurality of camera systems 7 will be hereinafter referred to as "surveillance region". In the surveillance region, there are objects to be analyzed by the servers 8. In the following, the case where the surveillance region is an airport and the object is a person will be described as appropriate. However, the surveillance region is not limited to airports, and the objects are not limited to people. For example, the object may be a vehicle, an animal, or the like.

Each individual camera system 7 includes a camera. In addition, the camera system 7 has a flow line detection function of detecting flow lines of people (objects) from images picked up by the camera and an event detection function of detecting events, and inputs data streams representing the flow lines of people (objects) to the data stream allocation system 1 of the present invention. In the present exemplary embodiment, the data streams represent the flow lines of objects, so an individual data stream corresponds to an individual person.

For example, a data stream is a time series of data in which a time is associated with the position of an object at that time in order of time. In the data stream, the time at which an event was detected is associated not only with the position but also with information indicating the event. An event means, for example, various predetermined movements (movements of an object) such as "putting down luggage". From the data stream, the flow line of the object and the location and time of occurrence of the event can be figured out. The camera system 7 also adds the identification (ID) of the camera system 7 to the generated data stream.

The configuration of the camera system 7 may be a configuration in which the camera has the flow line detection function, the event detection function, and a data stream generation function. Alternatively, the configuration of the camera system 7 may be a configuration in which the camera is connected in a wired or wireless manner with an information processing device that has the flow line detection function, the event detection function, and the data stream generation function.

The data stream allocation system 1 allocates data streams obtained from a plurality of camera systems 7 to servers 8, and distributes the data streams to the servers 8 to which they have been allocated.

Each server 8 analyzes objects using the data streams distributed from the data stream allocation system 1. Here, one example of analysis is to detect a predetermined pattern, for example. A predetermined pattern is a behavior or state of an object that is different from the normal. For example, "a person leaves luggage near a gate at an airport, moves to another gate, and enters that other gate", etc. falls under the predetermined pattern.

However, the predetermined patterns are not limited to the above examples. For example, as analysis processing, each server 8 may detect various behaviors and states, such as the passage of an object through a surveillance line, and in a surveillance region, objects entering, leaving, appearing, disappearing, fighting, staying, loitering, falling, standing up, sitting down, changing the direction of movement, running in reverse, shoplifting, bypassing, damaging, taking away, leaving behind, graffiti acts, queuing of objects, congestion, the act of a person leaving the queue and then returning to the queue, a person running, and so on. The object is not limited to a person, and may be a vehicle such as a car, or an animal.

The predetermined pattern may also be a specific event itself, such as a crime. The predetermined pattern may also be an event that occurred in a specific situation. The predetermined pattern may also be a situation in which a specific event and a specific event occurred in succession.

The detected predetermined patterns (unusual behaviors or states of objects) are used to detect crimes, prevent crimes, understand the convenience or satisfaction of users of facilities (e.g., airports), and so on.

The example shown in FIG. 1 illustrates the case where a data output unit 9 is provided that is connected to the servers 8. The data output unit 9 is implemented, for example, by a computer separate from the data stream allocation system 1. The data output unit 9 only needs to receive the analysis results (e.g., detection results of predetermined patterns) that the servers 8 output, and summarize the analysis results obtained from the servers 8 for output to an external system (not shown). The external system, on the basis of the analysis results at the servers 8, detects crimes, or calculates the convenience or satisfaction of users, for example. The data output unit 9 may integrate the analysis results obtained from the servers 8 based on time, and output the integrated results.

A description will now be made of the data stream allocation system 1 of the present invention. The data stream allocation system 1 includes an input unit 2, an information storage unit 3, an allocation determination unit 4, and a distribution unit 5.

The input unit 2 accepts data streams from a plurality of camera systems 7. For example, the input unit 2 receives, via a communication interface (not shown in FIG. 1) included in the data stream allocation system 1, data streams that the camera systems 7 transmitted to the data stream allocation system 1. The input unit 2 then sends the data streams accepted from the camera systems 7 to the distribution unit 5.

It should be noted that if the formats of the data streams are not unified due to differences in camera systems 7, the input unit 2 unifies the formats of the accepted data streams before sending them to the distribution unit 5. For example, assume that due to the differences in the camera systems 7, the data stream generated by one camera system 7 describes the time in world standard time, while the data stream generated by another camera system 7 describes the time in Japan time. In this case, the input unit 2 unifies the time descriptions of the accepted data streams into a single format.

The information storage unit 3 is a storage device that stores various information such as the allocation of areas to the servers 8 determined by the allocation determination unit 4. An area is an individual divided area defined by dividing the surveillance region. The process of defining areas by dividing the surveillance region is performed by the allocation determination unit 4.

The information storage unit 3 stores the information in the form of various tables as illustrated below.

The information storage unit 3 stores, for example, a camera system statistical information table, an area table, a server table, and a minimum area size table.

FIG. 2 schematically depicts an example of the camera system statistical information table. The camera system statistical information table stores, for each camera system 7, the ID of the camera system 7, the average number of objects, and the shooting position, in association with each other.

The shooting position is information that indicates the central position of the range to be captured by the camera system 7, and is expressed, for example, in latitude and longitude. The camera included in the camera system 7 is fixed in its installation position and orientation. Therefore, the individual shooting positions stored in the camera system statistical information table are fixed values and do not change.

The average number of objects for a camera system 7 is the average of the number of objects captured by the camera system 7 among the objects being analyzed by the servers 8. The allocation determination unit 4 monitors the servers 8 that are analyzing the objects using the data streams, to obtain for each camera system 7 the most recent average of the number of objects being analyzed by the analysis unit 80 (the plurality of servers 8). Since the ID of the camera system 7 is added to the data stream, the allocation determination unit 4 can obtain for each camera system 7 the most recent average of the number of objects being analyzed by the analysis unit 80 by monitoring the data streams used by the servers 8 in the analysis. The allocation determination unit 4 stores the most recent average of the number of objects obtained for each camera system 7 as the average number of objects in the camera system statistical information table (see FIG. 2) to thereby update the average number of objects. As such, the average number of objects in the camera system statistical information table stored in the information storage unit 3 is updated by the allocation determination unit 4.

FIG. 3 schematically depicts an example of the area table stored in the information storage unit 3. The area table stores, for each area, the ID of the area, a list of IDs of the camera systems 7 that take pictures in the area, the latest number of objects, the area position, and the area size, in association with each other.

The allocation determination unit 4, when defining individual areas by dividing the surveillance region, determines IDs for the respective areas. In addition, for each area, the allocation determination unit 4 identifies the camera system 7 whose shooting position (see FIG. 2) is included in the area. The number of camera systems 7 identified here is not necessarily one, but may be multiple. This camera system 7 is the camera system 7 that takes pictures in the area. The allocation determination unit 4 judges the area position and area size for each area. In the present exemplary embodiment, the case where the area is a rectangle and the area position is described using the latitude and longitude representing the position of the upper left vertex when the area is viewed from above will be described as an example. The area size is the vertical and horizontal lengths of the area. The area position and the area size define the range of the area.

The latest number of objects in the area table is the sum of the average numbers of objects (see FIG. 2) corresponding to the camera systems 7 that take pictures in the area. That is, it can be said that the latest number of objects is the most recent number of objects being analyzed by the analysis unit 80 using the data streams obtained from the camera systems 7 taking pictures in the area.

After defining the areas, the allocation determination unit 4 stores, for each area, the ID of the area, the IDs of the camera systems 7 taking pictures in the area, the area position, and the area size in the area table. The allocation determination unit 4 also calculates the latest number of objects for each area on the basis of the camera system statistical information table (see FIG. 2), and stores the latest number of objects in the area table. When the allocation determination unit 4 has updated the average number of objects in the camera system statistical information table, the unit also updates the latest number of objects in the area table accordingly.

FIG. 4 schematically depicts an example of the server table stored in the information storage unit 3. The server table stores, for each server 8, the ID of the server 8, a list of IDs of the areas allocated to the server 8, and the latest number of objects, in association with each other.

After allocating areas to a server 8, the allocation determination unit 4 stores in the server table the ID of the server 8, the list of the IDs of the areas allocated to the server 8, and the latest number of objects, in association with each other.

The latest number of objects in the server table is the sum of the latest numbers of objects associated with the areas allocated to the server 8. More specifically, the allocation determination unit 4 may read the latest number of objects associated with the areas allocated to the server 8 from the area table (see FIG. 3) and store the sum of the latest numbers of objects in the server table as the latest number of objects corresponding to the server 8. In the case of updating the latest number of objects in the area table in response to the update of the average number of objects in the camera system statistical information table, the allocation determination unit 4 also updates the latest number of objects in the server table accordingly.

The latest number of objects in the server table can be said to be the most recent number of objects being analyzed by each server 8.

There may be a case where a camera system 7 detects more than one flow line from one person. In addition, there may be a case where two or more camera systems 7 capture the same person and each detect the flow line. Therefore, the average number of objects in the camera system statistical information table (see FIG. 2) and the latest number of objects in the area table and server table are total numbers.

FIG. 5 schematically depicts an example of the minimum area size table stored in the information storage unit 3. The minimum area size table is a table that stores the smallest area size allowed (hereinafter, referred to as minimum area size). The allocation determination unit 4 will not define an area with a size smaller than the minimum area size.

The minimum area size is a predetermined, fixed value. The minimum area size is defined as a size that is wider than the shooting range of one camera system 7. The minimum area size is also defined to be wide enough to suppress the false detection of a predetermined pattern. For example, the act of a person leaving luggage near the gate of an airport and going to the restroom is a normal behavior and does not need to be detected as a predetermined pattern. However, even if the person who left luggage near the gate goes to the restroom, if the area size is too small to confirm the destination of the person, the person's act may be erroneously detected as the predetermined pattern. The minimum area size should be set wide enough to prevent such a situation. However, the appropriate minimum area size varies depending on the content of the analysis. Therefore, in the example shown in FIG. 5, the minimum area size is stored for each analysis ID that indicates the type of analysis content. The user of the data stream allocation system 1 and each server 8 designates the minimum area size according to the content of the analysis. Then, the allocation determination unit 4 defines each area on the basis of the minimum area size designated by the user. The allocation determination unit 4 repeatedly divides the surveillance region to define areas, which areas being not necessarily uniform in size.

When the allocation determination unit 4 defines areas by dividing the surveillance region and further allocates each of the areas to the server 8, the allocation determination unit 4 updates the contents of the area table (see FIG. 3) stored in the information storage unit 3 and the contents of the server table (see FIG. 4) also stored in the information storage unit 3.

In addition, when the allocation determination unit 4 monitors each server 8 that is analyzing objects using the data streams and updates the average number of objects in the camera system statistical information table (see FIG. 2), the allocation determination unit 4 correspondingly updates the latest number of objects in the area table and the latest number of objects in the server table.

That the difference between the maximum value and the minimum value of the latest number of objects corresponding to the individual servers 8 (the latest number of objects for each server stored in the server table) has become a threshold value or more means that the unevenness in the number of objects being analyzed by the servers 8 has increased. Thus, when the difference between the maximum and minimum values of the latest number of objects stored in the server table becomes the threshold value or more, the allocation determination unit 4 redivides the surveillance region to redefine areas anew. Then, the allocation determination unit 4 allocates each of the areas to one of the servers 8. This process will be described in detail later using a flowchart.

Once an area is defined, the camera system 7 that takes pictures in that area can be identified. The camera system 7 and the data stream obtained from that camera system 7 are associated with each other. Therefore, by allocating each of the areas to one of the servers 8, the allocation determination unit 4 is allocating the data streams obtained from each of the camera systems 7 to the one of the servers 8.

The distribution unit 5 distributes the data streams obtained from the camera systems 7 to the servers 8 on the basis of the results of the allocation of the areas to the servers 8. More specifically, for each camera system 7, the distribution unit 5 distributes the data streams obtained from the camera system 7 to the server 8 to which the area including the shooting position of that camera system 7 has been allocated. At this time, the distribution unit 5 transmits each of the data streams to the server 8 to which it should be distributed, via the communication interface (not shown in FIG. 1) included in the data stream allocation system 1.

The data stream allocation system 1 of the present invention is implemented by at least one or more computers.

For example, the input unit 2, the allocation determination unit 4, and the distribution unit 5 may be implemented by a central processing unit (CPU) of one computer that operates in accordance with a data stream allocation program. In this case, for example, the CPU may read the data stream allocation program from a program recording medium such as a program storage device of the computer, and operate as the input unit 2, the allocation determination unit 4, and the distribution unit 5 in accordance with the data stream allocation program.

Alternatively, for example, the data stream allocation system 1 may be implemented by two or more computers connected in a wired or wireless manner.

Figure 6:
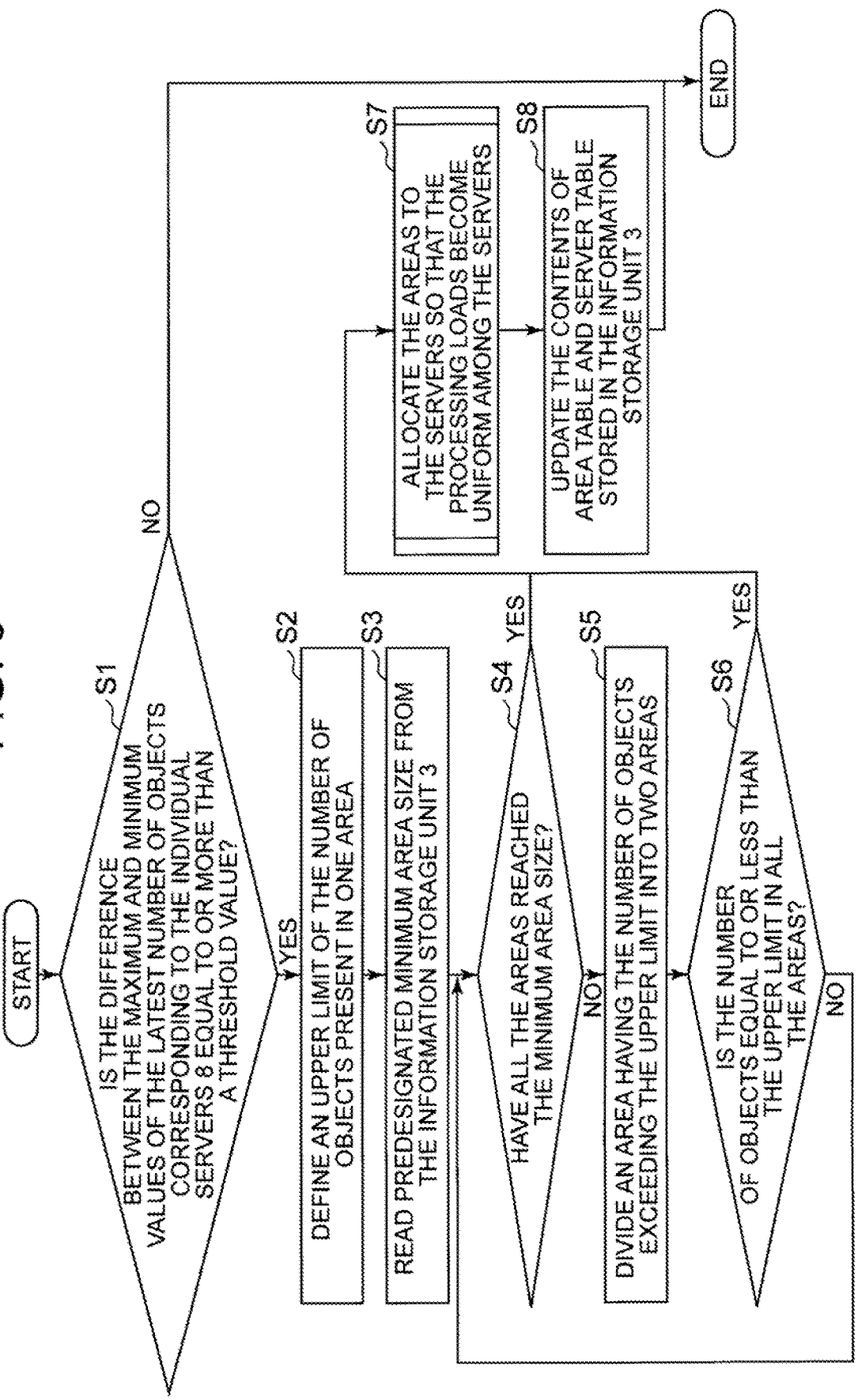
FIG. 6 It is a flowchart illustrating an example of a process performed by an allocation determination unit 4 of, in response to an event that the unevenness in the number of objects being analyzed by individual servers 8 becomes large, dividing the surveillance region to define individual areas and allocating each area to one of the servers 8.

A description will now be made of the processing procedure in the present exemplary embodiment. FIG. 6 is a flowchart illustrating an example of the process, performed by the allocation determination unit 4 when the unevenness in the number of objects being analyzed by the servers 8 becomes large, of dividing the surveillance region to define individual areas and allocating each area to one of the servers 8.

It is assumed that the allocation determination unit 4 has already performed the operation of defining a plurality of areas and allocating the individual areas to one of the servers 8, and that the camera system statistical information table, area table, and server table are stored in the information storage unit 3. It is also assumed that the allocation determination unit 4 is in the state of monitoring each server 8 that is analyzing objects using data streams and, when there is a change, updating the average number of objects in the camera system statistical information table, the latest number of objects in the area table, and the latest number of objects in the server table. In order for the allocation determination unit 4 to monitor each server 8 that is using the data streams to analyze objects, the distribution unit 5 must have distributed the data streams to the servers 8 on the basis of the results of the allocation of areas to the servers 8. Therefore, at the start of operation of the data stream allocation system 1, the allocation determination unit 4 may arbitrarily define a plurality of areas and arbitrarily allocate each area to a server 8. For example, at the start of operation, the allocation determination unit 4 may divide the surveillance region into the same number of areas as the number of servers 8, and allocate one area to one server 8.

It is also assumed that, before the start of operation, the user has designated a minimum area size in advance from within the minimum area size table according to the content of the analysis, and that the designated minimum area size is stored in the information storage unit 3.

The allocation determination unit 4 judges whether the difference between the maximum value and the minimum value of the latest number of objects corresponding to the individual servers 8 has become a threshold value or more (step S1). In other words, the allocation determination unit 4 judges whether the difference between the maximum and minimum values of the latest number of objects for each server stored in the server table has reached or exceeded the threshold value. This threshold value is predetermined.

If the difference between the maximum and minimum values of the latest number of objects corresponding to the individual servers 8 is less than the threshold value (No in step S1), it can be said that the unevenness in the number of objects that the servers 8 are analyzing is small. In this case, the allocation determination unit 4 terminates the process without redefining areas.

If the difference between the maximum and minimum values of the latest number of objects corresponding to the individual servers 8 is the threshold value or more (Yes in step S1), it can be said that the unevenness in the number of objects that the servers 8 are analyzing is large. In this case, the allocation determination unit 4 defines an upper limit of the number of objects present in one area on the basis of the total number of objects and the number of servers 8 (step S2). The allocation determination unit 4 calculates the total number of objects by summing the average number of objects for each camera system 7 stored in the camera system statistical information table. Then, the allocation determination unit 4 calculates the upper limit of the number of objects present in one area by dividing the total number of objects by the number of servers 8. For example, if the total number of objects (people) is 431 and the number of servers 8 is 10, then the allocation determination unit 4 defines the upper limit of the number of objects present in one area to be 431/10=43.1 (people).

In addition, in step S2, the allocation determination unit 4 defines the entire surveillance region as one area.

Next, the allocation determination unit 4 reads from the information storage unit 3 the minimum area size designated in advance (step S3).

Next, the allocation determination unit 4 judges whether the size of all the areas has reached the minimum area size (step S4). If all the areas have reached the minimum area size (Yes in step S4), the process proceeds to step S7.

If not all the areas have reached the minimum area size (No in step S4), the process proceeds to step S5. When the process enters step S4 for the first time, the process proceeds to step S5 because the entire surveillance region has been set as one area.

In step S5, the allocation determination unit 4 divides an area having the number of objects exceeding the upper limit defined in step S2 into two areas. As described previously, it is assumed in the present exemplary embodiment that each area is a rectangle. When dividing one area into two areas in step S5, the allocation determination unit 4 divides the area perpendicular to the long side of the rectangle. Dividing the area in this manner avoids creation of extremely long and narrow areas. In the case of dividing a square area, the allocation determination unit 4 may divide the area perpendicular to one of the sides.

Next, the allocation determination unit 4 judges whether the number of objects in all the areas is equal to or less than the upper limit defined in step S2 (step S6). If the number of objects in every area is equal to or less than the upper limit defined in step S2 (Yes in step S6), the process proceeds to step S7.

If there is an area where the number of objects exceeds the upper limit defined in step S2 (No in step S6), the allocation determination unit 4 repeats the process from step S4 onward.

Figure 7:
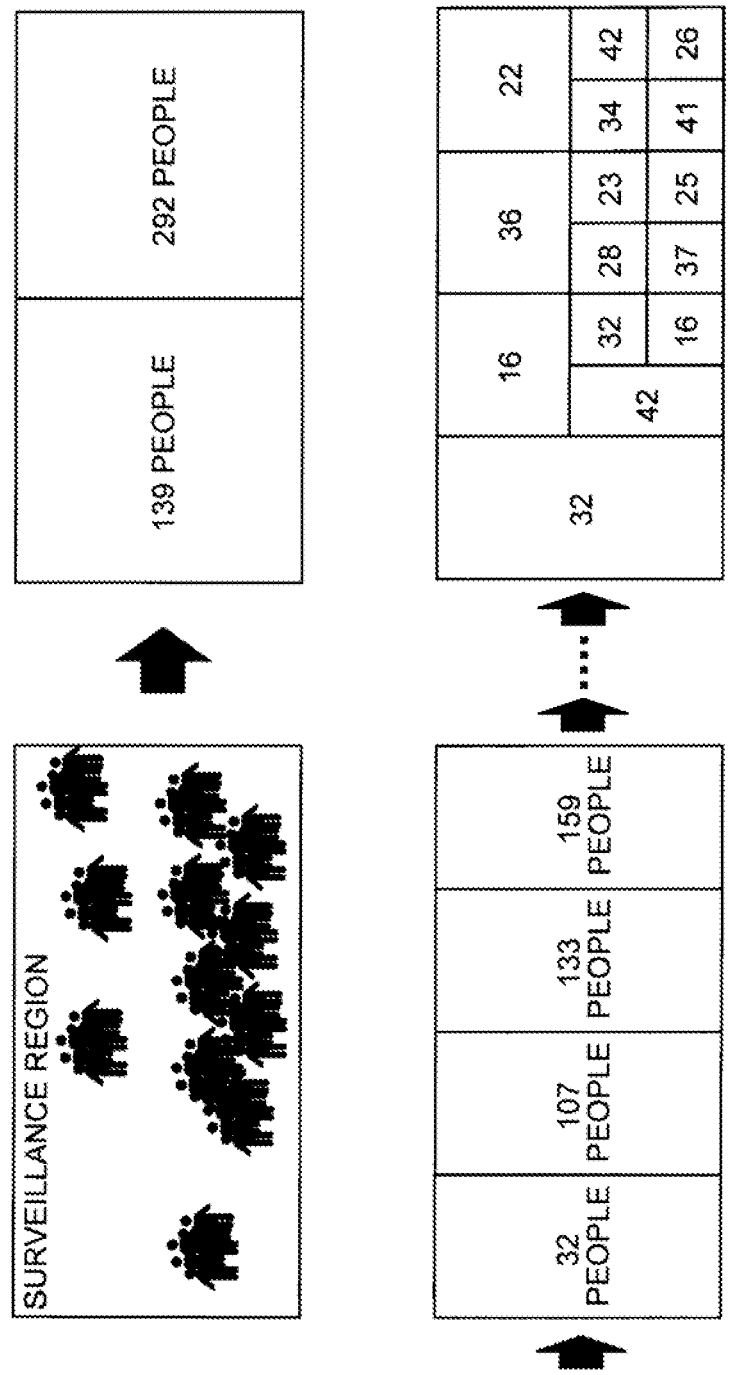
FIG. 7 It schematically depicts how the surveillance region is divided into a plurality of areas through the loop process of steps S4 to S6.

FIG. 7 schematically depicts how the surveillance region is divided into a plurality of areas through the loop process of steps S4 to S6. FIG. 7 illustrates the case where the object is a person and the upper limit defined in step S2 is 43.1 people, as in the above example. In the last divided state shown in FIG. 7, the number of people is equal to or less than the upper limit (43.1 people) in all the areas. Therefore, in the example shown in FIG. 7, the process proceeds to step S7 when the last divided state shown in FIG. 7 is reached.

In step S7, the allocation determination unit 4 allocates the areas to the servers 8 so as to make the processing loads uniform among the servers 8. However, the processing load does not have to be completely equal in each server 8. The process in step S7 will be described later with reference to the flowchart shown in FIG. 10.

Following the step S7, the allocation determination unit 4 updates the contents of the area table and the server table stored in the information storage unit 3 (step S8).

Suppose that the area table and server table before step S1 are in the state shown in FIGS. 3 and 4, respectively. Examples of the area table and server table after performing the processes in steps S1 through S8 from this state are shown in FIGS. 8 and 9, respectively. FIG. 9 indicates that the unevenness in the latest number of objects for each server has been suppressed compared to the example shown in FIG. 4.

Figure 10:
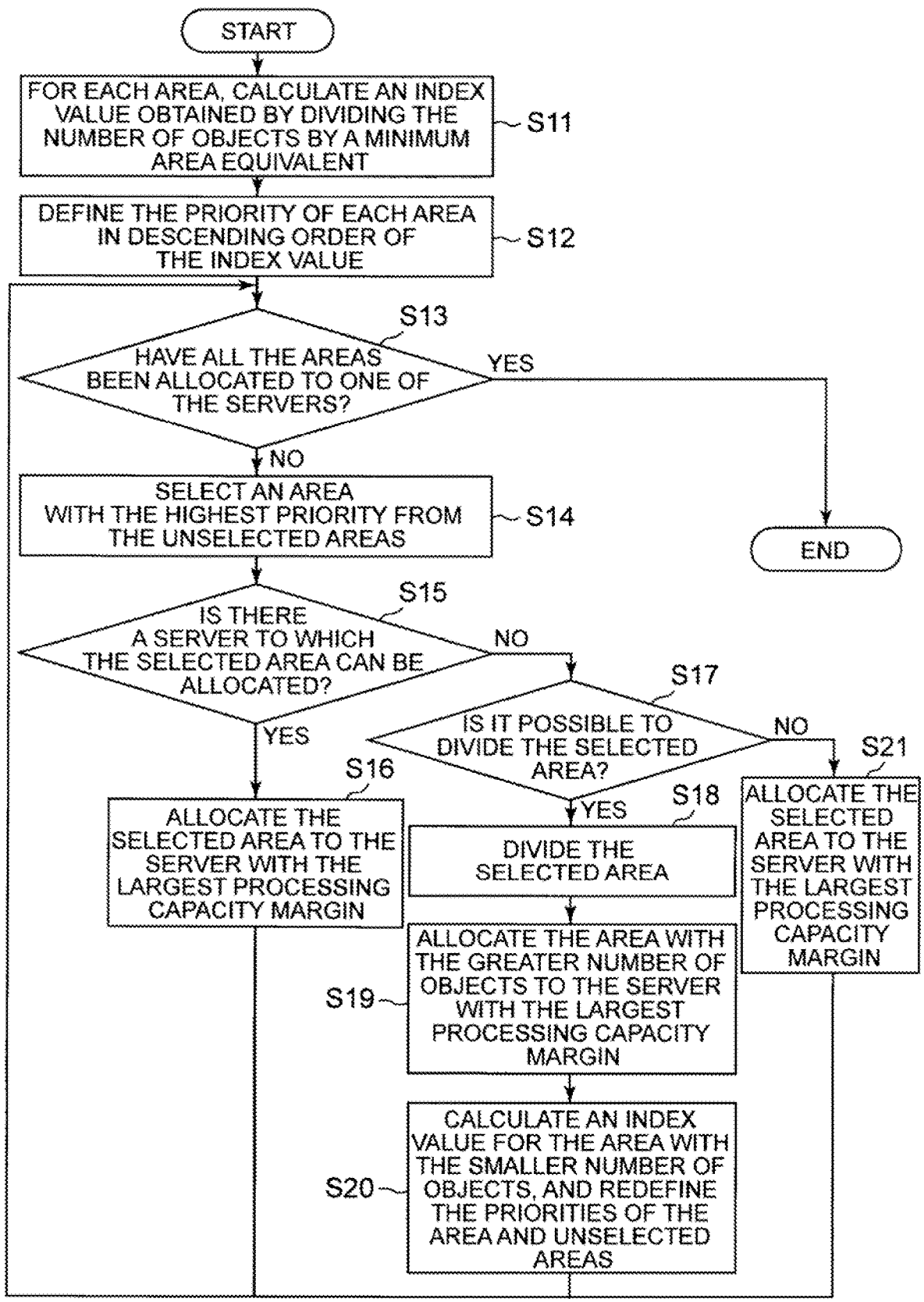
FIG. 10 It is a flowchart illustrating an example of the processing procedure in step S7.

The processing procedure in step S7 (see FIG. 6) will now be described. FIG. 10 is a flowchart illustrating an example of the processing procedure in step S7.

In the present exemplary embodiment, each server 8 has a processing capacity standard defined in advance. The processing capacity standard is a value that is preferably not exceeded by the number of objects to be analyzed by the server 8. However, the server 8 may analyze a number of objects that exceeds the processing capacity standard. The value obtained by subtracting the number of objects in the area allocated to the server 8 from the processing capacity standard is referred to as processing capacity margin. It is here assumed that there are ten servers 8 as in the previous example and the processing capacity standard for each server 8 is "50". The ten servers 8 are distinguished by the symbols a through j.

Here, it is assumed that the areas are divided as shown in FIG. 11 at the time of shifting to step S7. Each number shown in FIG. 11 is the number of people (objects) present in the area. Symbols A to O are used to distinguish each area.

In step S7, the allocation determination unit 4 calculates, for each area, an index value obtained by dividing the number of objects by a minimum area equivalent (step S11). The minimum area equivalent is a value that indicates how many areas of the minimum area size the area is equivalent to.

Next, the allocation determination unit 4 defines the priority for each area in descending order of the index value calculated for each area in step S1*l* (step S12). FIG. 12 shows the index values calculated for the areas A to O (see FIG. 11) and the priorities defined in step S12. For example, in the area N, the number of people is 41 and the minimum area equivalent is 1. Therefore, the index value for the area N is 41/1=41. The index values for the other areas can be obtained in a similar manner. Since the index value for the area N is the largest, when the priority of each area is defined in descending order of the index value, the priority of the area N becomes 1.

The larger the number of objects in the area and the smaller the area size, the larger the index value. Therefore, the priority becomes higher for an area that has a large number of objects in the area and has a small area size. This priority represents the order of allocation to a server. An area with a small area size may not be able to be further divided, so in the present exemplary embodiment, the priority is defined by calculating the index value so as to cause such an area to be given a higher priority.

Following the step S12, the allocation determination unit 4 judges whether all the areas have been allocated to one of the servers 8 (step S13). If all the areas have been allocated to one of the servers 8 (Yes in step S13), step S7 is terminated, and the process proceeds to step S8 (see FIG. 6).

If there is at least one area yet to be allocated to a server 8 (No in step S13), the allocation determination unit 4 selects an area with the highest priority from among the unselected areas (step S14). The area selected in step S14 is referred to as the selected area. When the process enters step S14 for the first time, none of the areas has been selected. Therefore, in the present example, the area with the highest priority, N (see FIGS. 11 and 12), is selected at the first time transition to step S14.

Following the step S14, the allocation determination unit 4 judges whether there is a server 8 to which the selected area can be allocated (step S15). The server 8 to which the selected area can be allocated is a server 8 that has the processing capacity margin of equal to or more than the number of people (number of objects) in the selected area.

In the present example, at the time of the first shift to step S15, the processing capacity margin is "50" for all the servers 8, which means that there is a server 8 to which the selected area can be allocated (Yes in step S15).

If there is no server 8 to which the selected area can be allocated (No in step S15), the process proceeds to step S17. The case of proceeding to step S17 will be described later.

If there is a server 8 to which the selected area can be allocated (Yes in step S15), the allocation determination unit 4 allocates the selected area to the server 8 having the largest processing capacity margin (step S16). If there is more than one server 8 with the largest processing capacity margin, the allocation determination unit 4 may allocate the selected area to any one of those servers 8. Following the step S16, the allocation determination unit 4 repeats the process from step S13 onward.

In the present example, until the area E becomes the selected area, the process shifts from step S15 to step S16 and does not shift to step S17. FIG. 13 depicts the results of area allocation in the loop process of steps S14 to S16 up to the time when the area E, which has the eleventh priority, became the selected area.

After selecting the area E having the eleventh priority and allocating the area E to the server i in step S16 as shown in FIG. 13, the process proceeds to step S13 and then to step S14 where the area F having the twelfth priority is selected. Using this as an example, the process in the case of shifting from step S15 to step S17 (see FIG. 10) will be described.

The number of people (the number of objects) in the area F is 36 (see FIG. 11). On the other hand, in the area allocation state shown in FIG. 13, there is no server 8 having the processing capacity margin of equal to or more than "36", which is the number of people in the area F. For example, the server h is the server 8 with the largest processing capacity margin in the area allocation state shown in FIG. 13. However, the processing capacity margin of the server h is 50−25=25, which is less than 36. Therefore, in step S15 after selecting the area F, the allocation determination unit 4 judges that there is no server 8 to which the selected area (area F) can be allocated (No in step S15). In this case, the process proceeds to step S17.

In step S17, the allocation determination unit 4 judges whether the selected area (area F) can be divided. At this time, if each area obtained by dividing the selected area equally into two areas will have a size equal to or bigger than the minimum area size, then the allocation determination unit 4 may judge that the selected area can be divided. If each area obtained by dividing the selected area equally into two areas will have a size smaller than the minimum area size, then the allocation determination unit 4 may judge that the selected area cannot be divided.

If it is judged that the selected area cannot be divided (No in step S17), the allocation determination unit 4 allocates the selected area to the server 8 having the largest processing capacity margin (step S21). The resultant number of objects to be processed by that server 8 may exceed the standard value ("50" in the present example) of the processing capacity. Following the step S21, the allocation determination unit 4 repeats the process from step S13 onward.

In the present example, as can be seen from FIG. 11, the area F can be divided. Therefore, the allocation determination unit 4 judges that the selected area can be divided (Yes in step S17). In this case, the process proceeds to step S18.

In step S18, the allocation determination unit 4 divides the selected area (area F) into two areas. The method of division is the same as the method of division in step S5 (see FIG. 6). More specifically, the allocation determination unit 4 divides the selected area perpendicular to the long side of the selected area. If the selected area is a square, the allocation determination unit 4 may divide the selected area perpendicular to one of the sides.

FIG. 14 schematically depicts the state of the areas after dividing the area F from the state shown in FIG. 11. It is assumed that the two areas resulting from the division of the area F in step S18 are represented as area F1 and area F2. It is also assumed that in the present example, the number of people in the area F1 is 15, and the number of people in the area F2 is 21 (see FIG. 14).

Following the step S18, the allocation determination unit 4 allocates one of the two areas obtained by the division in step S18 that has the larger number of objects (number of people) to the server 8 having the largest processing capacity margin (step S19). In the present example, the allocation determination unit 4 allocates the area F2 to the server h having the largest processing capacity margin (see FIG. 13). The area allocation for each server 8 after allocating the area F2 to the server h is shown in FIG. 15.

Next to step S19, the allocation determination unit 4 calculates an index value for the area with the smaller number of objects (in the present example, area F1) out of the two areas obtained by the division in step S18. This method of calculating the index value is the same as the method of calculating the index value in step S11. More specifically, the allocation determination unit 4 calculates the index value by dividing the number of objects by the minimum area equivalent. The number of people in the area F1 is 15 (see FIG. 14), and the minimum area equivalent of the area F1 is 2. Thus, the allocation determination unit 4 calculates 15/2=7.5 as the index value of the area F1. Further, the allocation determination unit 4 redefines the priorities of the area and the area(s) yet to be selected (step S20). At this time, the allocation determination unit 4 may redefine the priorities of the area and the unselected area(s) in descending order of the index value. In the present example, the allocation determination unit 4 may redefine the priorities of the area F1 and the unselected areas K, B, and A.

Following the step S20, the allocation determination unit 4 repeats the process from step S13 onward.

If it is judged in step S13 that all the areas have been allocated to one of the servers 8 (Yes in step S13), step S7 is terminated. The allocation determination unit 4 then performs the operation of step S8 (see FIG. 6). More specifically, the allocation determination unit 4 updates the contents of the area table and the server table stored in the information storage unit 3 on the basis of the results of the process up to step S7 (see step S8, FIG. 6).

As a result of step S8 shown in FIG. 6, the contents of the area table and the server table are updated. Thereafter, the allocation determination unit 4 monitors each server 8 that is analyzing the objects using the data streams and, when there is any change, updates the average number of objects in the camera system statistical information table, the latest number of objects in the area table, and the latest number of objects in the server table. The allocation determination unit 4 then judges whether the difference between the maximum value and the minimum value of the latest number of objects corresponding to the individual servers 8 has become the threshold value or more (see step S1, FIG. 6). If the difference between the maximum value and the minimum value has reached or exceeded the threshold value, the process from step S2 onward is executed again.

Further, as explained previously, by allocating each of the areas to one of the servers 8, the allocation determination unit 4 is allocating the data streams obtained from each of the camera systems 7 to the one of the servers 8.

Figure 16:
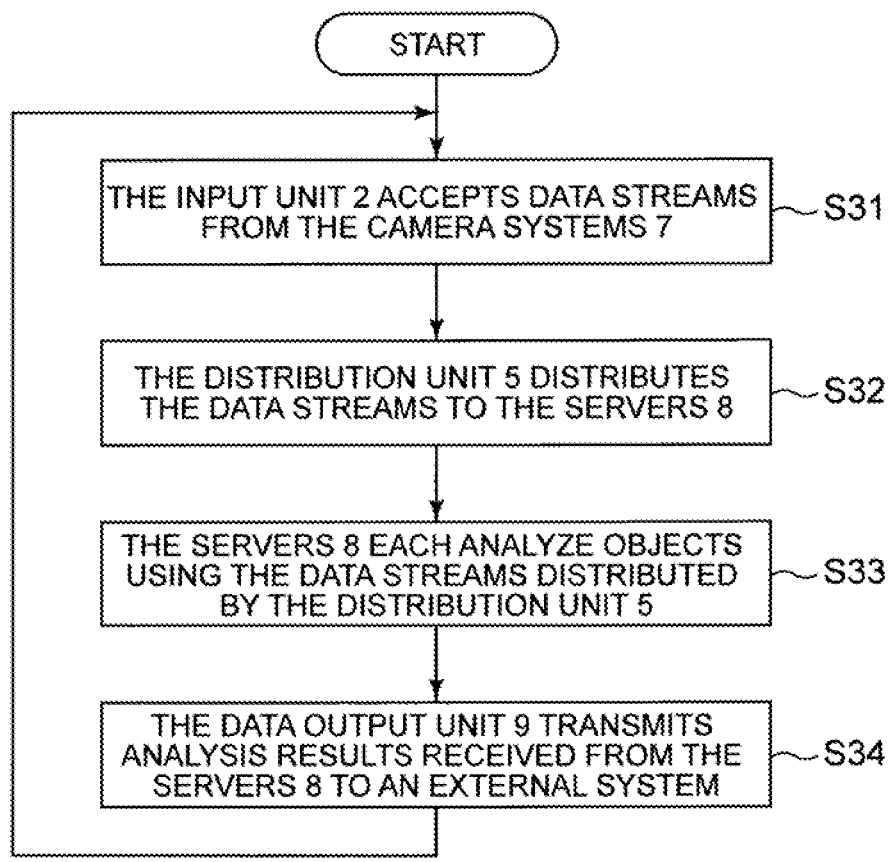
FIG. 16 It is a flowchart illustrating an example of the processing procedure in which the data stream allocation system 1 distributes the data streams accepted from the camera systems 7 to the servers 8 and each server 8 performs analysis.

A description will now be made of the processing procedure in which the data stream allocation system 1 distributes the data streams accepted from the camera systems 7 to the servers 8, and each server 8 performs the analysis. FIG. 16 is a flowchart illustrating an example of this processing procedure. It should be noted that the matters already described will be omitted as appropriate.

The input unit 2 accepts data streams from the camera systems 7 (step S31). The input unit 2 sends the accepted data streams to the distribution unit 5.

The distribution unit 5 distributes the data streams to the servers 8 (step S32). In the case of focusing on a single data stream, the distribution unit 5 may judge the server 8 to which the data stream is to be distributed as follows. The data stream has added thereto the ID of the camera system 7 that generated the data stream. The distribution unit 5 identifies the area corresponding to the ID of the camera system 7 added to the data stream by referring to the area table illustrated for example in FIG. 8. In other words, the distribution unit 5 identifies the area that includes the shooting position of the camera system 7 that generated the data stream. The distribution unit 5 then identifies the server 8 to which the identified area has been allocated by referring to the server table illustrated for example in FIG. 9. This server 8 is the server 8 to which the data stream being focused on is to be distributed. The distribution unit 5 identifies the server 8 to be the distribution destination for each data stream, and distributes the individual data streams to the servers 8 identified as their distribution destination.

The servers 8 each analyze the objects using the data streams distributed by the distribution unit 5 of the data stream allocation system 1 (step S33). For example, each server 8 uses the distributed data streams to detect a predetermined pattern. Each server 8 then transmits, as a result of the analysis, information indicating that it has detected the predetermined pattern and the data stream representing the predetermined pattern, for example, to the data output unit 9.

The data output unit 9 summarizes the analysis results received from the servers 8 and transmits the analysis results to an external system (not shown) (step S34). The external system then performs, for example, detection of crimes, calculation of the convenience or satisfaction of users, or the like.

When the camera systems 7 further send data streams to the data stream allocation system 1, the process from step S31 onward is repeated.

In the above procedure, the allocation determination unit 4 monitors each server 8 that is analyzing objects using the data streams and, when there is any change, updates the average number of objects in the camera system statistical information table, the latest number of objects in the area table, and the latest number of objects in the server table. The allocation determination unit 4 then judges whether the difference between the maximum value and the minimum value of the latest number of objects corresponding to the individual servers 8 has become the threshold value or more (see step S1, FIG. 6). If the difference between the maximum value and the minimum value has reached or exceeded the threshold value, the process from step S2 onward is executed again.

In the present exemplary embodiment, the fact that the difference between the maximum and minimum values of the latest number of objects corresponding to the individual servers 8 becomes a threshold value or more means that the number of objects being analyzed by the individual servers 8 is uneven. That is, it means that the processing load is unevenly distributed among the servers 8. In this case, the allocation determination unit 4 executes the process of dividing the surveillance region and redefining the areas, and allocates each area to one of the servers 8. As such, the allocation determination unit 4 updates the correspondence between the areas and the servers 8. At this time, the allocation determination unit 4 repeats dividing any area having the number of objects exceeding the upper limit (the upper limit defined in step S2) into two areas in the loop process of steps S4 to S6. Thus, the areas are defined according to the unevenness in the number of objects in the surveillance region. Furthermore, the allocation determination unit 4 defines the priorities of the areas and allocates the areas, in descendent order of the priority, to the server 8 having the largest processing capacity margin. It is therefore possible to suppress the inequality in the processing loads on the servers 8, and as a result, it is also possible to suppress delays in the analysis processing at the servers 8.

From the standpoint of detecting a predetermined pattern, it is preferable that an area is large. As described above, the allocation determination unit 4 repeats dividing the area having the number of objects exceeding the upper limit into two areas in the loop process of steps S4 to S6. This means that the area with the number of objects equal to or less than the upper limit will not further be divided even if its size is large. Therefore, according to the present exemplary embodiment, it is possible to define as large an area as possible, which is preferable for analysis at the servers 8.

Figure 17:
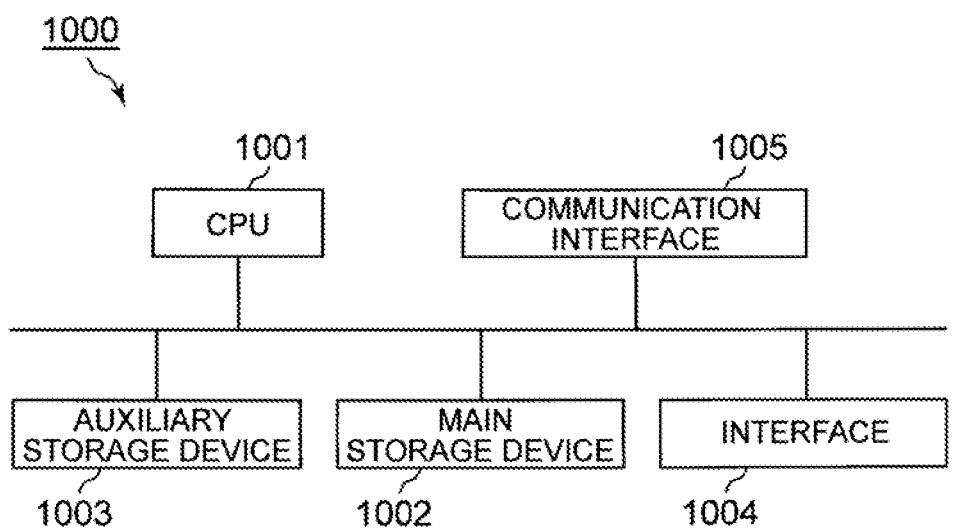
FIG. 17 It is a schematic block diagram depicting an exemplary configuration of a computer according to the data stream allocation system 1 of an exemplary embodiment of the present invention.

FIG. 17 is a schematic block diagram depicting an exemplary configuration of a computer according to the data stream allocation system 1 of an exemplary embodiment of the present invention. The computer 1000 includes a CPU 1001, a main storage device 1002, an auxiliary storage device 1003, an interface 1004, and a communication interface 1005.

The data stream allocation system 1 of the exemplary embodiment of the present invention is implemented, for example, by the computer 1000. The operations of the data stream allocation system 1 are stored in the auxiliary storage device 1003 in the form of a data stream allocation program. The CPU 1001 reads the data stream allocation program from the auxiliary storage device 1003 and deploys the program to the main storage device 1002 to perform the processing described in the above exemplary embodiment in accordance with the data stream allocation program.

The auxiliary storage device 1003 is an example of a non-transitory tangible medium. Other examples of the non-transitory tangible media include a magnetic disk, magneto-optical disk, compact disk read only memory (CD-ROM), digital versatile disk read only memory (DVD-ROM), semiconductor memory, and the like, connected via the interface 1004. In the case where the program is delivered to the computer 1000 via a communication line, the computer 1000 receiving the delivery may deploy the program to the main storage device 1002 and perform the above-described processing.

The program may also be for implementing part of the processing described above. Further, the program may be a differential program that achieves the above-described processing in combination with another program already stored in the auxiliary storage device 1003.

Some or all of the components of the data stream allocation system 1 may be implemented by general purpose or dedicated circuitry, processors, etc., or combinations thereof. They may be configured by a single chip or a plurality of chips connected via a bus. Some or all of the components may be implemented by a combination of the above-described circuitry etc. and the program.

When some or all of the components of the data stream allocation system 1 are implemented by a plurality of information processing devices or circuits, the information processing devices or circuits may be disposed in a centralized or distributed manner. For example, the information processing devices or circuits may be implemented in the form of a client and server system, a cloud computing system, or the like, in which the devices or circuits are connected via a communication network.

Figure 18:
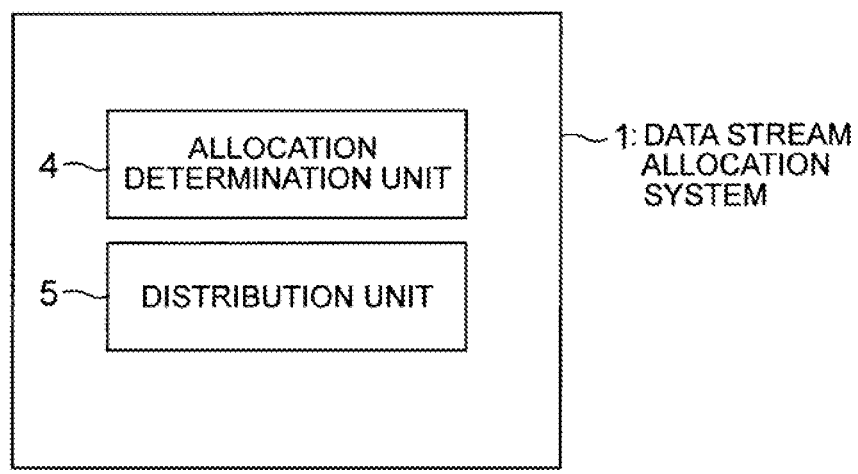
FIG. 18 It is a block diagram depicting an outline of a data stream allocation system of the present invention.

An outline of the present invention will now be described. FIG. 18 is a block diagram depicting an outline of a data stream allocation system of the present invention. The data stream allocation system 1 allocates data streams, obtained from a plurality of camera systems (e.g., a plurality of camera systems 7) that capture a surveillance region, to a plurality of servers (e.g., a plurality of servers 8) that analyze objects in the surveillance region using the data streams. The data stream allocation system 1 includes an allocation determination unit 4 and a distribution unit 5.

The allocation determination unit 4 allocates the data streams obtained from the plurality of camera systems to the plurality of servers according to the unevenness in the number of objects in the surveillance region.

The distribution unit 5 then distributes each of the data streams obtained from the plurality of camera systems to the server to which the data stream has been allocated, in accordance with the results of the allocation of the data streams to the plurality of servers.

Such a configuration can suppress the inequality in processing loads on the servers and the delays in analysis processing at the servers.

While the present invention has been described with reference to the exemplary embodiment, the present invention is not limited to the above exemplary embodiment. The configurations and details of the present invention can be subjected to various modifications appreciable by those skilled in the art within the scope of the present invention.

INDUSTRIAL APPLICABILITY

The present invention is suitably applicable to the allocation of data streams to a plurality of servers.

REFERENCE SIGNS LIST 1 data stream allocation system
2 input unit
3 information storage unit
4 allocation determination unit
5 distribution unit
7 camera system
8 server
9 data output unit

What is claimed is:

1. A data stream allocation method implemented by at least one computer and a plurality of servers that analyze objects in a surveillance region using data streams obtained from a plurality of camera systems capturing the surveillance region, the method comprising:
the steps performed by the at least one computer of
allocating the data streams obtained from the plurality of camera systems to the plurality of servers according to unevenness in a number of the objects in the surveillance region, and in accordance with a result of the allocation of the data streams to the plurality of servers, distributing each of the data streams obtained from the plurality of camera systems to the server to which the data stream has been allocated; and the step performed by each of the plurality of servers of analyzing the objects using the data streams distributed by the at least one computer, wherein the data stream allocation method further comprises the steps performed by the at least one computer of dividing the surveillance region into a plurality of areas according to the unevenness in the number of objects in the surveillance region, and allocating each individual area to one of the plurality of servers to thereby allocate the data streams obtained from the plurality of camera systems to the plurality of servers, and in response to an event that a difference between a maximum value and a minimum value of the number of objects being analyzed by the individual servers becomes equal to or more than a threshold value, dividing the surveillance region into the plurality of areas again and allocating each individual area to one of the plurality of servers.

2. The data stream allocation method according to claim 1, comprising the steps performed by the at least one computer of defining an upper limit of the number of objects present in one area on the basis of a total number of objects and the number of servers, and dividing the surveillance region into the plurality of areas so as to cause the number of objects present in each individual area to be equal to or less than the upper limit, calculating, for each area, an index value obtained by dividing the number of objects by a minimum area equivalent, the minimum area equivalent being a value that indicates how many areas of a predetermined minimum area size the area is equivalent to, and selecting an area in descending order of the index value and allocating the selected area to the server with a largest processing capacity margin.

3. The data stream allocation method according to claim 2, comprising the step performed by the at least one computer of in the case where the allocation of the selected area to the server with the largest processing capacity margin would cause said server to exceed a processing capacity standard of the server, dividing the selected area further into two areas and allocating one of the two areas to the server with the largest processing capacity margin.

4. The data stream allocation method according to claim 1, comprising the step performed by each of the plurality of servers of conducting an analysis process to detect a predetermined behavior or state of an object using the distributed data streams.

5. A data stream allocation system of allocating data streams obtained from a plurality of camera systems capturing a surveillance region to a plurality of servers that analyze objects in the surveillance region using the data streams, the data stream allocation system comprising:

an allocation determination unit configured to allocate the data streams obtained from the plurality of camera systems to the plurality of servers according to unevenness in a number of the objects in the surveillance region; and a distribution unit configured to distribute each of the data streams obtained from the plurality of camera systems to the server to which the data stream has been allocated, in accordance with a result of the allocation of the data streams to the plurality of servers, wherein the allocation determination unit divides the surveillance region into a plurality of areas according to the unevenness in the number of objects in the surveillance region, and allocates each individual area to one of the plurality of servers to thereby allocate the data streams obtained from the plurality of camera systems to the plurality of servers, and in response to an event that a difference between a maximum value and a minimum value of the number of objects being analyzed by the individual servers becomes equal to or more than a threshold value, divides the surveillance region into the plurality of areas again and allocates each individual area to one of the plurality of servers.

6. A non-transitory computer-readable recording medium in which a data stream allocation program is recorded, the data stream allocation program for causing a computer to allocate data streams obtained from a plurality of camera systems capturing a surveillance region to a plurality of servers that analyze objects in the surveillance region using the data streams, the data stream allocation program causing the computer to perform:

an allocation determination process of allocating the data streams obtained from the plurality of camera systems to the plurality of servers according to unevenness in a number of the objects in the surveillance region; and a distribution process of distributing each of the data streams obtained from the plurality of camera systems to the server to which the data stream has been allocated, in accordance with a result of the allocation of the data streams to the plurality of servers, wherein the data stream allocation program causes the computer to perform, in the allocation determination process, dividing the surveillance region into a plurality of areas according to the unevenness in the number of objects in the surveillance region, and allocating each individual area to one of the plurality of servers to thereby allocate the data streams obtained from the plurality of camera systems to the plurality of servers, and in response to an event that a difference between a maximum value and a minimum value of the number of objects being analyzed by the individual servers becomes equal to or more than a threshold value, dividing the surveillance region into the plurality of areas again and allocating each individual area to one of the plurality of servers.

* * * * *